UNITED STATES PATENT OFFICE 1,924,059

PREPARATION OF COFFEE

William Hoskins, La Grange, Ill., assignor, by mesne assignments, to Harold W. Clark, Berkeley, Calif.

No Drawing. Application August 7, 1931, Serial No. 555,874. Renewed January 30, 1933

1 Claim. (Cl. 99—8)

This invention relates to the preparation of coffee and more particularly concerns the preparation of the coffee bean for use by grinding or comminuting it after it has been subjected to the conventional roasting or heat treatment.

The grinding, or comminuting operation, exposes the interior constituents of the coffee bean to the air and there is a marked tendency for certain of the more or less volatile of the valued natural aroma, flavor, and taste-imparting constituents of the bean to pass off into the air. This tendency particularly asserts itself during the actual grinding operation because of the heat developed during the grinding. Also, there is a tendency for the valued constituents of the bean to lose their freshness and become rancid or stale as a result of their exposure to the air, during or following the grinding or cutting operation.

I have found that the valued aroma, flavor, and taste-imparting natural constituents of coffee may be substantially all retained in the comminuted bean during grinding by maintaining the coffee bean at a substantially reduced temperature while being ground. I have also found that these desired constituents may be retained in the coffee and in a substantially fresh condition by maintaining the coffee, after its grinding, at a low temperature, at a reduced temperature and/or by maintaining it in the substantial absence of air.

In accordance with the present invention, I reduce the temperature of the coffee bean during the grinding operation to a point where substantial loss of the valued aroma, flavor, and taste-imparting constituents does not occur, by maintaining a refrigerating medium in the presence of and in contact with the coffee during grinding. While the refrigerant may be brought into contact with the coffee before it reaches the grinding operation, it is desirable to provide a refrigerant in contact with the coffee while undergoing grinding. This may be accomplished by admixing an inert refrigerating medium of the character hereinafter set forth directly with the coffee prior to or during grinding. Another way of providing a refrigerant in contact with the coffee being ground or comminuted is to provide the grinding or cutting devices with passages or chambers through which a refrigerant medium may be introduced during grinding.

In accordance with the present invention the refrigerant which is to be brought into direct contact with the coffee is suitably a vaporizing gas, expanding from a liquid or solid state and cooled by its change of state; for example, a congealed, solid substance which normally exists in the gaseous state and passes from the solid state without going through the liquid state. A suitable substance of this type is, for example, solidified carbon dioxide. By supplying such a substance in contact with the coffee being ground, or cut, an extremely effective refrigerating effect is secured during the actual comminuation of the coffee. Also, as the cold solid refrigerant substance undergoes sublimation, the coffee undergoing cutting or grinding is surrounded by a cold atmosphere of an inert gas, substantially moisture free and is preserved against any deleterious action.

It is preferred to enclose the coffee to be ground, as well as the grinding mechanism within a cabinet or housing which is preferably insulated. This cabinet or housing may be substantially gas tight, and preferably is provided with valved openings, or other suitable vent means, adapted to maintain a slight pressure of the evolved gas in excess of atmospheric pressure within the cabinet or housing, thereby preventing ingress of atmospheric air and consequent condensation of moisture upon the chilled coffee and the grinding mechanism during operation.

The reduction of temperature of the coffee undergoing grinding may be controlled by varying the relative proportion of solid refrigerant. It is desirable to maintain the coffee during grinding at a temperature below 40° F. and preferably below 10° F. say 0° F., more or less. At such low temperatures, the valued, normally volatile aroma, flavor, and taste-imparting constituents are substantially non-volatile and remain within the comminuted particles of the coffee bean.

Following the grinding operation it is desirable to maintain the coffee at a reduced temperature and preferably in a non-oxidizing atmosphere until it is placed in a substantially airtight container, so that the valued constituents will not be lost nor become substantially deteriorated. It is preferred to maintain the ground coffee at such a low temperature by means of a solid refrigerant of the type employed during grinding. Thus an excess of the refrigerant may be added to the coffee during grinding so that some will remain in the ground coffee during the packing operation; or, if desired, an additional quantity may be admixed with the coffee following grinding. The ground coffee while chilled, and preferably while containing some of the solid refrigerant, is then packed in substantially airtight containers. Thus substantially none of the desired constituents will be lost from the coffee and an atmosphere free from air will be formed within the container by continued sublimation of the solid refrigerant. The container is preferably provided with a small vent so that excess quantities of the evolved gas may escape therefrom. This vent may or may not be sealed following the evaporation of the solid refrigerant. In the latter case, the vent may have such a small opening that substantially no air will pass into the container.

The necessary temperature reduction may be effected during grinding or cutting of the coffee by maintaining a cold refrigerant in indirect heat exchange relation with the coffee undergoing grinding or cutting. This may be effected, as already indicated, by maintaining a refrigerant within the cutters or grinders. Or, such temperature reduction may be accomplished by surrounding the grinding zone with a jacket or passageway for a refrigerant. The refrigerant so used may comprise any suitable fluid, such as ammonia, brine, etc.

It will be understood that the coffee prior to or during comminution may be directly contacted with a cold gaseous substance expanding from the liquid or solid state, the said substance may or may not be in contact with the coffee while it is in the liquid or solid state. Thus, many of the conventional normally gaseous substances ordinarily employed for refrigerating purposes may be expanded into the gaseous state and the cold freshly liberated gases contacted with the coffee during comminution and/or prior to or during its placement in a tight container or package.

The specific details of the process above set forth are not intended to be regarded as limitations upon the scope of the invention, except insofar as included in the accompanying claim.

I claim:

The method of preparing roasted coffee beans which comprises admixing with the roasted coffee beans a solid refrigerant substance which normally exists in the gaseous state and which is capable of changing from the solid state directly into the gaseous state and comminuting the coffee beans while in admixture with said refrigerant, thereby maintaining the coffee in such chilled condition that the normally volatile natural aroma-imparting constituents will remain in the comminuted coffee particles, and packing the chilled coffee particles in a closed container and while said coffee particles are admixed with said solid refrigerant, thereby forming an atmosphere of the resulting gases within said packed container.

WILLIAM HOSKINS.